United States Patent
Chillar et al.

(10) Patent No.: US 8,469,588 B2
(45) Date of Patent: Jun. 25, 2013

(54) SYSTEM AND METHOD FOR COMPRESSOR INLET TEMPERATURE MEASUREMENT

(75) Inventors: Rahul Jaikaran Chillar, Marietta, GA (US); Adil Ansari, Kennesaw, GA (US)

(73) Assignee: General Electric Company, Schenectady, NY (US)

( * ) Notice: Subject to any disclaimer, the term of this patent is extended or adjusted under 35 U.S.C. 154(b) by 546 days.

(21) Appl. No.: 12/772,601

(22) Filed: May 3, 2010

(65) Prior Publication Data

US 2011/0268149 A1 Nov. 3, 2011

(51) Int. Cl.
*G01J 5/12* (2006.01)
*G01K 3/00* (2006.01)

(52) U.S. Cl.
USPC ..... 374/124; 374/137; 374/144; 374/E13.006

(58) Field of Classification Search
USPC ............ 374/121, 124, 130, 137, 144, E3.001, 374/E13.006; 702/135, 136; 60/803
See application file for complete search history.

(56) References Cited

U.S. PATENT DOCUMENTS

| | | | | |
|---|---|---|---|---|
| 4,058,975 A * | 11/1977 | Gilbert et al. | ............... | 60/39.281 |
| 4,710,095 A | 12/1987 | Freberg et al. | | |
| 6,748,733 B2 * | 6/2004 | Tamaro | ....................... | 60/39.182 |
| 6,931,857 B2 | 8/2005 | Irwin et al. | | |
| 6,962,043 B2 * | 11/2005 | Venkateswaran et al. | . | 60/39.091 |
| 6,983,603 B2 * | 1/2006 | Macchia | ........................ | 60/772 |
| 7,231,307 B2 * | 6/2007 | Takei et al. | ..................... | 702/99 |
| 7,617,686 B2 * | 11/2009 | Lilley et al. | ..................... | 60/772 |
| 2004/0076218 A1 * | 4/2004 | Tomlinson et al. | ........... | 374/144 |
| 2009/0055071 A1 * | 2/2009 | Way et al. | ..................... | 701/100 |
| 2009/0272122 A1 | 11/2009 | Shi et al. | | |
| 2009/0285259 A1 * | 11/2009 | Allen et al. | .................... | 374/130 |
| 2010/0143090 A1 * | 6/2010 | Smith et al. | ....................... | 415/1 |
| 2011/0215936 A1 * | 9/2011 | Ansari et al. | ................... | 340/584 |
| 2011/0240858 A1 * | 10/2011 | Estevadeordal et al. | ... | 250/338.3 |
| 2011/0265443 A1 * | 11/2011 | Ansari et al. | ................. | 60/39.23 |

FOREIGN PATENT DOCUMENTS

| | | | |
|---|---|---|---|
| JP | 61181921 A | * | 8/1986 |
| JP | 08296453 A | * | 11/1996 |
| JP | 2004170375 A | * | 6/2004 |
| WO | WO0122045 A1 | * | 3/2001 |

OTHER PUBLICATIONS

U.S. Appl. No. 12/328,145, filed Dec. 4, 2008.
Ansari et al., U.S. Appl. No. 12/718,932, filed Mar. 5, 2010.
Ansari et al., U.S. Appl. No. 12/772,626, filed May 3, 2010.

* cited by examiner

*Primary Examiner* — R. A. Smith
(74) *Attorney, Agent, or Firm* — Fletcher Yoder P.C.

(57) ABSTRACT

A system includes a radiation detector array directed toward a fluid flow into a compressor. The radiation detector array is configured to output a signal indicative of a two-dimensional temperature profile of the fluid flow. The system also includes a controller communicatively coupled to the radiation detector array. The controller is configured to detect a temperature variation across the fluid flow based on the signal.

19 Claims, 5 Drawing Sheets

SYSTEM AND METHOD FOR COMPRESSOR INLET TEMPERATURE MEASUREMENT

BACKGROUND OF THE INVENTION

The subject matter disclosed herein relates to a system and method for compressor inlet temperature measurement.

In general, gas turbine engines combust a mixture of compressed air and fuel to produce hot combustion gases. The combustion gases may flow through a turbine to generate power for a load and/or a compressor. The compressor compresses air through a series of stages, each stage having multiple blades rotating about a central shaft. As will be appreciated, temperature variations across an air flow into the compressor may produce an uneven air density distribution within the compressor. Consequently, the compressor blades may experience premature wear as the blades pass through regions of varying density. As a result, the useful life of compressor blades may be reduced compared to compressors which receive an air flow having a substantially uniform temperature distribution.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a radiation detector array directed toward a fluid flow into a compressor. The radiation detector array is configured to output a signal indicative of a two-dimensional temperature profile of the fluid flow. The system also includes a controller communicatively coupled to the radiation detector array. The controller is configured to detect a temperature variation across the fluid flow based on the signal.

In a second embodiment, a system includes an inlet configured to provide an air flow to a compressor. The system also includes a radiation detector array directed toward a cross-section of the inlet substantially perpendicular to a direction of the air flow. The radiation detector array is configured to output a signal indicative of a two-dimensional temperature profile of the air flow within the cross-section.

In a third embodiment, a method includes measuring thermal radiation of an air flow into a compressor via a radiation detector array, and determining a two-dimensional temperature profile of the air flow based on the measurement. The method also includes detecting a temperature variation across the air flow based on the two-dimensional temperature profile.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
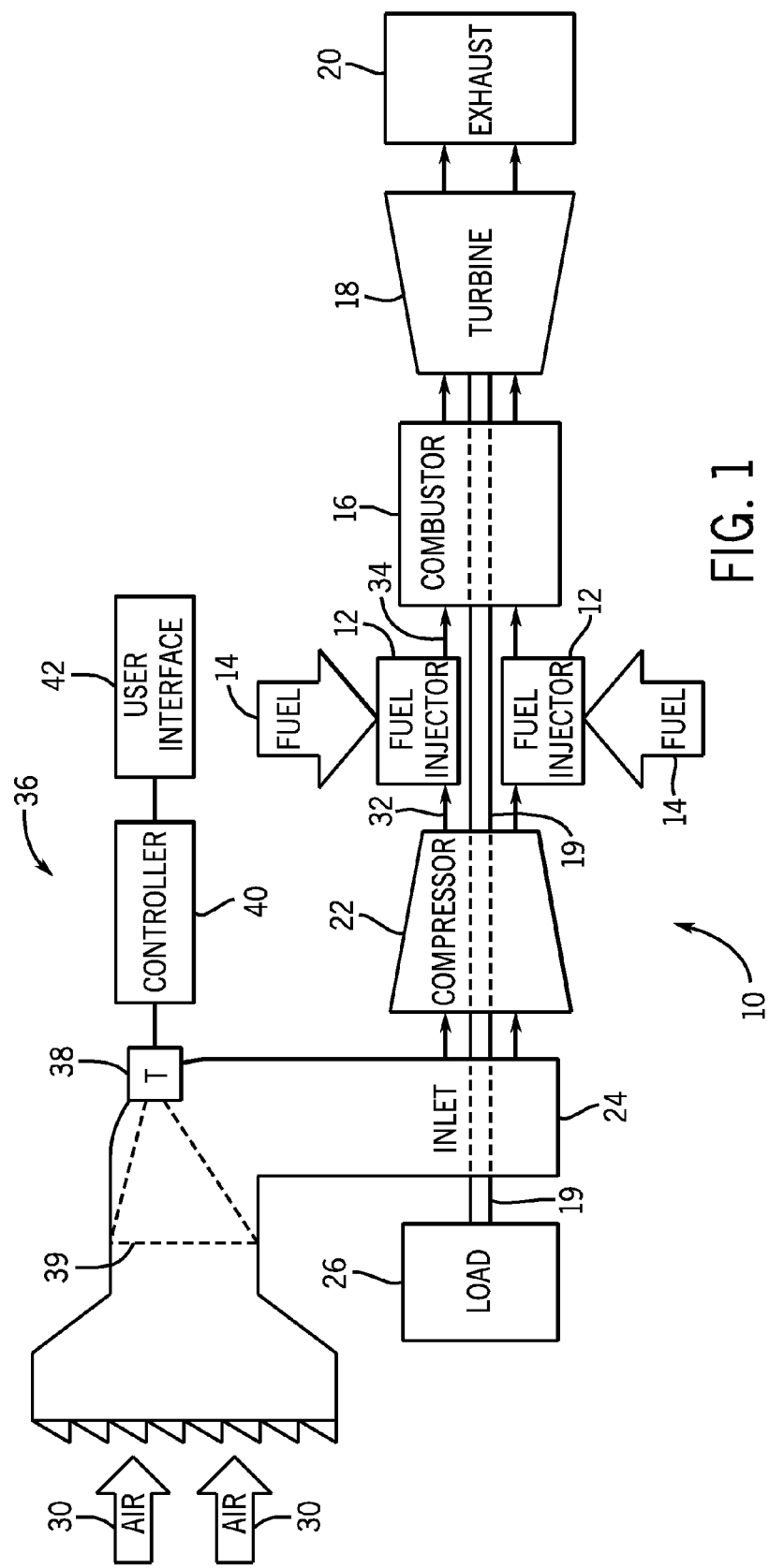
FIG. 1 is a block diagram of an embodiment of a gas turbine system including a thermal measurement system configured to detect an excessive temperature variation across an air flow into a compressor of the gas turbine system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Temperature variations across an air flow into a gas turbine compressor may produce an uneven air density distribution within the compressor. Consequently, compressor blades may experience premature wear as the blades pass through regions of varying density. As a result, the useful life of compressor blades may be reduced compared to compressors which receive an air flow having a substantially uniform temperature distribution (e.g., temperature variations less than approximately 20, 17, 15, 12, 10, 8, 6, 4, or 2 degrees Fahrenheit, or less). Therefore, it may be desirable to monitor a temperature profile of the air flow into the compressor to detect an excessive temperature variation (e.g., a temperature variation greater than approximately 2, 4, 6, 8, 10, 12, 15, 17, or 20 degrees Fahrenheit, or more). For example, certain compressor inlets include multiple thermocouples in fluid communication with the air flow. If one thermocouple detects a temperature substantially different (e.g., outside of a range defined by the excessive temperature variation) from the temperature detected by the other thermocouples, then an operator may be informed of the condition so corrective action may be taken. Unfortunately, because thermocouples only measure the temperature of air in direct contact with the thermocouple, temperature variations between thermocouples may be undetected. Furthermore, employing a large number of thermocouples may be economically undesirable, and may obstruct the flow of air into the compressor.

Embodiments of the present disclosure may detect a temperature variation, such as an excessive temperature variation, across an air flow into a gas turbine compressor by measuring thermal radiation of the air flow via a thermal radiation detector array. Such a configuration may monitor an entire two-dimensional cross-section of the air flow without substantially restricting flow into the compressor. For example, certain embodiments include a thermal radiation detector array directed toward a fluid flow into a compressor. The thermal radiation detector array is configured to output a signal indicative of a two-dimensional temperature profile of the fluid flow. In addition, a controller, communicatively coupled to the thermal radiation detector array, is configured to detect an excessive temperature variation across the fluid flow based on the signal. For example, the controller may be configured to detect the excessive temperature variation if a temperature difference between a region of the fluid flow and an average temperature of the fluid flow exceeds a threshold value. Alternatively, the controller may be configured to detect the excessive temperature variation if a temperature difference between a first region of the fluid flow and a second region of the fluid flow exceeds a threshold value. Because the thermal radiation detector array may monitor the entire two-dimensional cross-section of the fluid flow, substantially all temperature variations within the fluid flow may be detected. Consequently, an operator may be informed of an excessive temperature variation and/or the controller may deactivate the gas turbine engine before the condition adversely affects the compressor. As a result, the useful life of the compressor blades may be extended, thereby decreasing operational costs of the gas turbine engine.

Turning now to the drawings, FIG. 1 is a block diagram of a turbine system 10 including a thermal measurement system configured to detect an excessive temperature variation across an air flow into a compressor. The turbine system 10 is described below for the purpose of providing context for embodiments of the present thermal measurement system. It should be appreciated that the thermal measurement system described below may be utilized for detecting temperature variations across air flows into other axial compressors, such as those used in air separation plants, blast furnaces, or other applications employing compressed air. In addition, while an air flow is described below, it should be appreciated that certain embodiments of the present disclosure may be employed to detect an excessive temperature variation across other fluid flows (e.g., carbon dioxide, nitrogen, etc.) into a compressor.

In the present embodiment, the turbine system 10 includes a fuel injector 12, a fuel supply 14, and a combustor 16. As illustrated, the fuel supply 14 routes a liquid fuel and/or gas fuel, such as natural gas, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized exhaust gas into a turbine 18. As will be appreciated, the turbine 18 includes one or more stators having fixed vanes or blades, and one or more rotors having blades which rotate relative to the stators. The exhaust gas passes through the turbine rotor blades, thereby driving the turbine rotor to rotate. Coupling between the turbine rotor and a shaft 19 will cause the rotation of the shaft 19, which is also coupled to several components throughout the gas turbine system 10, as illustrated. Eventually, the exhaust of the combustion process may exit the gas turbine system 10 via an exhaust outlet 20.

A compressor 22 includes blades rigidly mounted to a rotor which is driven to rotate by the shaft 19. As air passes through the rotating blades, air pressure increases, thereby providing the combustor 16 with sufficient air for proper combustion. The compressor 22 may intake air to the gas turbine system 10 via an inlet 24. Further, the shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane, and so forth. As discussed in detail below, the inlet 24 draws air 30 into the gas turbine system 10 via a series of temperature control devices, such as an inlet bleed heat system, a fogger system, a chiller system and/or an evaporative cooling system. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As illustrated, the turbine system 10 includes a thermal measurement system 36 configured to detect temperature variations, such as excessive temperature variations, across an air flow into the compressor 22. In the present embodiment, the thermal measurement system 36 includes a radiation detector array, such as the illustrated thermal radiation detector array 38, directed toward an air flow through the compressor inlet 24. The thermal radiation detector array 38 is configured to output a signal indicative of a two-dimensional temperature profile of the air flow. For example, as discussed in detail below, the thermal radiation detector array 38 may include multiple thermopile elements, with each element directed toward a different region of the air flow. Because each thermopile element is configured to output a temperature of the respective region, a two-dimensional temperature profile of the air flow may be established. As illustrated, the thermal radiation detector array 38 is directed toward a cross-section 39 of the inlet 24 substantially perpendicular to a direction of the air flow. In this configuration, an entire two-dimensional cross-section of the air flow may be monitored, thereby ensuring that substantially any temperature variation across the air flow will be detected. Furthermore, because the thermal radiation detector array 38 may monitor the air temperature without direct contact with the air, the detector array 38 may be positioned outside of the flow path into the compressor 22, thereby substantially reducing or eliminating the air flow restriction associated with thermocouple measurement.

As will be appreciated, the thermal radiation detector array 38 measures electromagnetic energy from an object to determine a temperature of the object. For example, the detector array 38 may measure thermal radiation having a wavelength within an infrared spectrum. As discussed in detail below, the intensity of certain infrared emissions may be proportional to the temperature of the object. In certain embodiments, the thermal radiation detector array 38 is configured to detect such emissions and output a signal indicative of temperature. It also should be appreciated that various thermal radiation detector array configurations may be employed to determine the two-dimensional temperature profile of the air flow into the compressor 22. As previously discussed, certain detector arrays 38 may include a series of thermopile elements. As will be appreciated, a thermopile includes multiple thermocouples connected in series to obtain an enhanced signal output. Thermocouples measure the temperature difference between hot and cold junctions by generating an electromotive force (emf) between the junctions. For example, the hot junctions may be directed toward the air flow to measure thermal radiation, and the cold junctions may be coupled to a heat sink such that a temperature of the cold junctions is substantially equal to the ambient temperature. Because the thermocouples are connected in series, the thermopile sums the emf of all the thermocouples to provide an enhanced voltage output. Establishing an array of thermopile elements may generate a two-dimensional temperature profile of the air flow, with each thermopile element providing a temperature of a respective monitored region. In certain embodiments, the thermopile array may be a single solid state device, with each thermopile element formed on the surface of the device. Alternative embodiments may employ radiation pyrometers, infrared detectors (e.g., CCD, FPA, etc.) or other thermal radiation detector arrays configured to output a two-dimensional temperature profile of the air flow into the compressor 22.

In the present embodiment, the thermal radiation detector array 38 is communicatively coupled to a controller 40. The controller 40 is configured to detect an excessive temperature variation across the air flow based on a signal indicative of the two-dimensional temperature profile output by the thermal radiation detector array 38. As discussed in detail below, the inlet 24 may include a series of temperature control devices configured to increase or decrease the temperature of the air flow into the compressor 22. If one of these temperature control devices is not operating properly, a temperature variation may be established within the inlet 24. As previously discussed, such a temperature variation may induce a density gradient within the compressor 22, resulting in premature wear of compressor components. Consequently, the controller 40 may monitor the two-dimensional temperature profile measured by the thermal radiation detector array 38 to determine whether a temperature variation across the air flow exceeds compressor design criteria.

While a single thermal radiation detector array 38 is directed toward the air flow through the inlet 24 in the present embodiment, it should be appreciated that multiple detector arrays 38 may be employed in alternative embodiments to monitor various areas of the inlet 24. For example, a thermal radiation detector array 38 may be directed toward the air flow downstream from each temperature control device to ensure that each device is providing a substantially even temperature distribution to the air flow. In further embodiments, a series of thermal radiation detector arrays 38 may be disposed along the inlet 24, and configured to monitor multiple cross-sections 39 of the inlet 24. In such embodiments, the controller 40 may generate a three-dimensional temperature profile of the air flow, thereby enabling detection of an excessive temperature variation at substantially any location within the inlet 24.

The present embodiment also includes a user interface 42 communicatively coupled to the controller 40. The user interface 42 may include a numerical display configured to display the temperature detected by each element of the thermal radiation detector array 38 and/or a graphical interface configured to display the temperatures as a function of time. In this manner, an operator may monitor the temperature profile to identify an excessive temperature variation. In addition, the user interface 42 may include a visual and/or audible alarm configured to alert the operator of the excessive temperature variation. For example, if the controller 40 determines that a temperature of one region of the air flow is substantially greater than an average air flow temperature, the audible and/or visual alarm may be activated. In certain embodiments, the controller 40 is communicatively coupled to the gas turbine system 10, and configured to automatically decrease compressor speed and/or shut down the system 10 in response to detection of an excessive temperature variation.

In this manner, air flow into the compressor 22 may be reduced or terminated prior to significant blade wear, thereby ensuring the integrity of the compressor 22.

Figure 2:
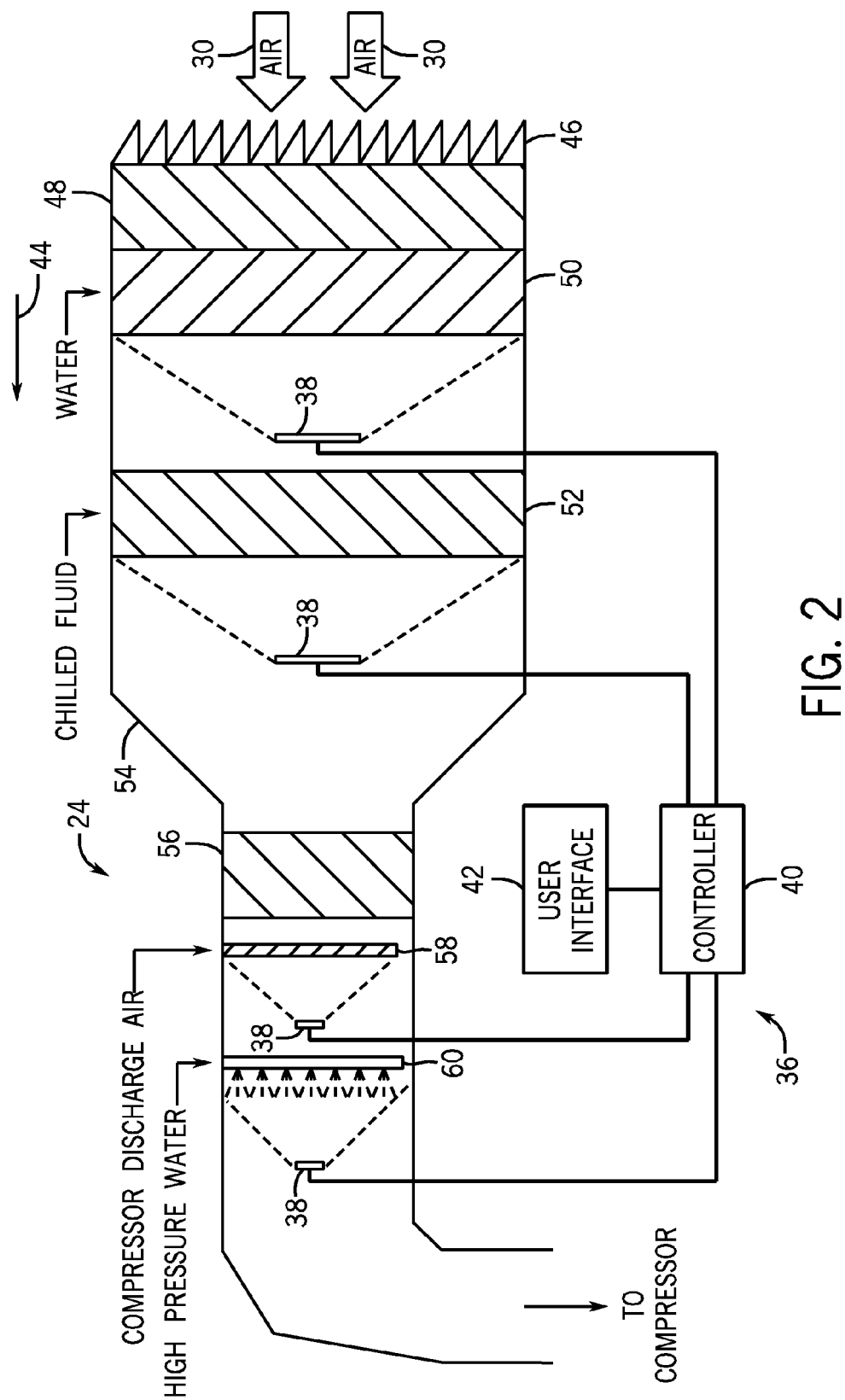
FIG. 2 is a schematic of an embodiment of a compressor inlet configured to provide an air flow to the compressor.

FIG. 2 is a schematic of an embodiment of a compressor inlet 24 configured to provide an air flow to the compressor 22. As illustrated, air 30 enters the inlet 24 and flows toward the compressor 22 along a downstream direction 44. In the present embodiment, the air enters the inlet 24 through a weather hood 46. As will be appreciated, the weather hood 46 includes a series of slats configured to deflect rain drops, sleet and/or snow away from the inlet 24, thereby substantially reducing the moisture content of the incoming air. The air flow then passes through a filter assembly 48 that removes dirt and/or other debris which may otherwise enter the gas turbine system 10.

The inlet 24 also includes a series of temperature control devices configured to increase or decrease the temperature of the air flow into the compressor 22. For example, the illustrated inlet 24 includes an evaporative cooling system 50 which utilizes water to cool the incoming air. Certain evaporative cooling systems spray water onto a porous medium positioned in the flow path of the incoming air. As the air passes through the medium, heat is transferred from the warmer air to the cooler water. In addition, a fraction of the water evaporates, thereby further reducing the air temperature. The evaporative cooling system 50 may also include a mist screen which blocks the flow of residual water droplets into the compressor 22. As illustrated, a thermal radiation detector array 38 is positioned downstream from the evaporative cooling system 50. In this configuration, the detector array 38 measures the two-dimensional temperature profile of the air flow downstream from the evaporative cooling system 50. Consequently, the thermal measurement system 36 may detect an excessive temperature variation resulting from improper operation of the evaporative cooling system 50.

The inlet 24 also includes a chiller system 52 positioned downstream from the evaporative cooling system 50. The chiller system 52 includes a series of heat transfer coils configured to transfer heat from the air flow to a chilled fluid passing through the coils. The chilled fluid may be water, ethylene glycol or any other suitable fluid. The chilled fluid may be cooled by a mechanical refrigeration system driven by a combustion engine, an electric motor or a steam turbine, for example. The chiller system 52 may be utilized alone or in combination with the evaporative cooling system 50 to decrease the temperature of the air flow into the compressor 22. As appreciated, decreasing the air temperature increases the density of the air flow, thereby providing the gas turbine system 10 with additional air for combustion. Similar to the evaporative cooling system 50 described above, a thermal radiation detector array 38 is positioned downstream from the chiller system 52 to monitor the two-dimensional temperature profile of the air flow from the chiller system 52.

As illustrated, the inlet 24 includes a transition section 54 downstream from the chiller system 52. The transition section 54 is configured to decrease the cross-sectional area of the inlet 24 to substantially match the intake area of the compressor 22. The inlet 24 also includes a silencer section 56 configured to decrease noise associated with operation of the gas turbine system 10. In the present embodiment, an inlet bleed heat system 58 is positioned downstream from the silencer section 56. The inlet bleed heat system 58 is configured to transfer heat from compressor discharge air to air flowing through the inlet 24. As will be appreciated, a temperature of the air flow from the compressor 22 may be greater than approximately 600, 700, 800, or 900 degrees Fahrenheit, or more. Consequently, by directing a portion of the compressor discharge air through a series of pipes within the inlet 24, the inlet bleed heat system 58 may increase the temperature of the air flow into the compressor 24. For example, the inlet bleed heat system 58 may be configured to substantially reduce the possibility of ice formation within the inlet 24 during periods when the turbine system 10 is operating at reduced power. In addition, by heating the air flow into the compressor 22, the inlet bleed heat system 58 may substantially reduce the possibility of back flow through the compressor 22, thereby ensuring the integrity of the gas turbine system 10. As discussed in detail below, a thermal radiation detector array 38 is positioned downstream from the inlet bleed heat system 58, and is configured to monitor a two-dimensional temperature profile of the air flow downstream from the inlet bleed heat system 58.

In the present embodiment, the inlet 24 also includes a fogger system 60 configured to further cool air flow into the compressor 22. In certain embodiments, the fogger system 60 includes a series of nozzles configured to spray water into the air flow. Similar to the evaporative cooling system 50 described above, heat transfer between the air flow and the water, along with evaporation of the water, serves to decrease the temperature of the air flow. As will be appreciated, the fogger system 60 may be provided with a supply of high pressure water from a pump driven by a combustion engine, an electric motor or a stream turbine, for example. Another thermal radiation detector array 38 may be positioned downstream from the fogger system 60 to measure a two-dimensional temperature profile of the air flow downstream from the fogger 60. As previously discussed, each thermal radiation detector array 38 is communicatively coupled to the controller 40, which is configured to detect an excessive temperature variation based on the two-dimensional temperature profile measured by each detector array 38. By employing a thermal radiation detector array 38 downstream from each temperature control device, an operator may readily identify which temperature control device is generating an excessive temperature variation. Such information may be presented to the operator via the user interface 42 such that the operator may take appropriate corrective action. In addition, the controller 40 may automatically decrease compressor speed and/or deactivate the gas turbine system 10 if an excessive temperature variation is detected at any location within the inlet 24.

Figure 3:
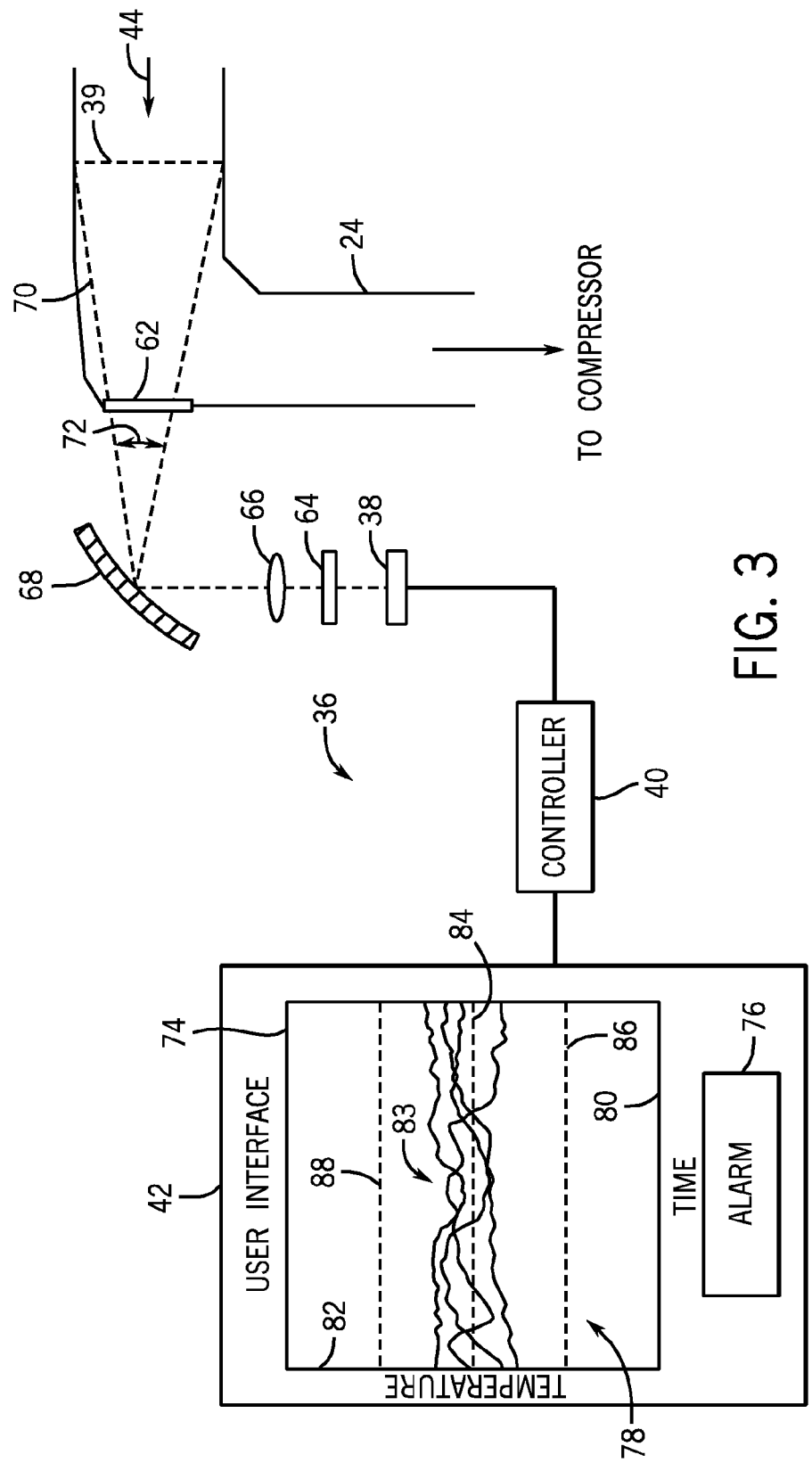
FIG. 3 is a schematic of an embodiment of the thermal measurement system directed toward an air flow through the compressor inlet.

FIG. 3 is a schematic of an embodiment of the thermal measurement system 36 directed toward an air flow through the compressor inlet 24. In the illustrated configuration, the thermal radiation detector array 38 is positioned outside of the inlet 24, thereby ensuring that the air flow is not restricted by the thermal measurement system 36. As illustrated, the inlet 24 includes a viewing port 62 configured to enable the thermal radiation detector array 38 to receive thermal radiation emitted by the air flow within the inlet 24. As will be appreciated, the viewing port 62 may be composed of a material that is substantially transparent to the wavelengths measured by the array 38. For example, if the detector array 38 is configured to monitor thermal radiation within an infrared spectrum, the viewing port 62 may be composed of a material substantially transparent to infrared radiation, such as sapphire or an infrared-transparent plastic. As a result of this configuration, the thermal radiation detector array 38 may measure a two-dimensional temperature profile of the air flow into the compressor 22 without obstructing the air flow.

In the present embodiment, a filter 64 and a lens 66 are positioned between the viewing port 62 and the thermal radiation detector array 38. In certain embodiments, the detector array 38 may include multiple thermopile elements to measure the thermal radiation emitted by the air flow. In such embodiments, each thermopile element includes multiple thermocouples electrically connected in series to provide an enhanced output signal. As will be appreciated, the thermopile elements may detect a variety of thermal radiation wavelengths. For example, certain thermopile elements may detect electromagnetic wavelengths within the infrared spectrum ranging from approximately 0.8 to 40 microns. As will be further appreciated, a particular subset of wavelengths within the infrared spectrum may be well-suited for temperature determination. Consequently, a band-pass filter 64 may be employed to limit the range of wavelengths incident upon the detector array 38. For example, in certain embodiments, the band-pass filter 64 may be configured to block electromagnetic radiation having a wavelength outside of a range between approximately 2 to 20, 4 to 18, 6 to 16, 8 to 14, or about 7.2 to 12.4 microns. Consequently, the filter 64 facilitates passages of thermal radiation onto the detector array 38 having a wavelength range suitable for each thermopile element to output a signal having a magnitude proportional to the measured temperature. The detector array 38 may aggregate the signals from the thermopile elements, and output a signal to the controller 40 indicative of the two-dimensional temperature profile of the air flow into the compressor 22.

It should be appreciated that alternative embodiments may employ other band-pass filters having other wavelength ranges. Furthermore, certain embodiments may employ a high-pass filter, a low-pass filter, or may omit the filter. Moreover, while a thermal radiation detector array 38 employing thermopile elements is employed in the present embodiment, it should be appreciated that other detector elements, such as CCD, FPA or pyrometer, may be employed in alternative embodiments.

The present thermal measurement system 36 also includes an optical focusing device, such as the lens 66, configured to focus the thermal radiation onto the detector array 38. As will be appreciated, the lens 66 may be composed of any suitable material, such as plastic or glass. In certain embodiments, the lens 66 may be combined with the filter 64 into a single element. In further embodiments, the lens 66 may be omitted such that thermal radiation passes directly onto the thermal radiation detector array 38.

The present embodiment also includes a second optical focusing device, such as the illustrated mirror 68. The mirror 68 is configured to direct thermal radiation from the air flow onto the thermal radiation detector array 38. In certain embodiments, the mirror 68 may include a substrate (e.g., glass, plastic, etc.) and a reflective coating (e.g., silver, chrome, etc.) disposed onto the substrate. Alternatively, the mirror 68 may be formed from a reflective material, such as polished stainless steel. The present embodiment employs a concave mirror 68 to establish a desired field of view 70. Due to the shape of the mirror 68 and the position of the thermal radiation detector array 38, a field of view 70 having an angle 72 is established. For example, in certain embodiments, the angle 72 may be greater than approximately 5, 10, 20, 40, 60, 80, 100, 120, 140 or 160 degrees, or more. As previously discussed, the thermal radiation detector array 38 may be directed toward the entire cross-section 39 of the inlet 24 to establish a two-dimensional temperature profile of the air flow. Consequently, the angle 72 may be selected such that the field of view 70 includes the entire inlet cross-section 39 at the desired measurement location. As a result, the thermal measurement system 36 may detect any temperature variation within the air flow, as compared to configurations which employ direct-contact thermocouples that may not detect temperature variations between thermocouples. It should be appreciated that alternative embodiments may employ a convex minor or a substantially flat minor to direct the thermal radiation toward the detector array 38. In further embodiments, the mirror 68 may be omitted, and the thermal radiation detector array 38 may be directed toward the air flow. In such embodiments, the lens 66, if present, may serve to establish a desired field of view 70 based on the shape and optical properties of the lens 66.

As previously discussed, the present thermal radiation detector array 38 includes thermopile elements configured to convert detected thermal radiation into an output signal. Because the thermopile elements include multiple thermocouples connected in series, the thermopile elements output an electrical signal having a magnitude proportional to a temperature of the region within the field of view of each respective element. The detector array 38 may aggregate the signals from the thermopile elements, and output a signal to the controller 40 indicative of the two-dimensional temperature profile of the air flow into the compressor 22. The controller 40 is configured to receive this signal, and to determine a two-dimensional temperature profile of the air flow within the inlet cross-section 39 based on the signal (e.g., via a look-up table, an algorithm, etc.). In the present embodiment, the controller 40 is communicatively coupled to a user interface 42 including a display 74 and an alarm 76. The display 74 is configured to present a graphical representation of the temperature detected by each thermopile element as a function of time.

As illustrated, the display 74 includes a graph 78 having an x-axis 80 representative of time, and a y-axis 82 representative of temperature. As previously discussed, each thermopile element of the detector array 38 is configured to output a signal indicative of the temperature of a region within the field of view of the element. In the present embodiment, the graph 78 includes a series of curves 83 that represents the temperature of each region as a function of time. The present graph 78 includes four curves 83, indicating that the thermal radiation detector array 38 includes four thermopile elements. However, it should be appreciated that the detector array 38 may include more or fewer elements, resulting in more or fewer curves 83 displayed on the graph 78.

The graph 78 also includes a dashed line 84 indicative of the average temperature of the air flow. As previously discussed, the thermal radiation detector array 38 may be directed toward the entire cross-section 39 of the inlet 24 to monitor the two-dimensional temperature profile of the air flow. By averaging the temperature within each region (e.g., area within the field of view of each thermopile element), the average temperature of the air flow may be computed. In certain embodiments, it may be desirable for the compressor 22 to receive an air flow having temperature variations within a defined range of the average air temperature. Consequently, the controller 40 may be configured to compare the temperature of each region to the average temperature to determine whether an excessive temperature variation is present. In such embodiments, the graph 78 includes a lower threshold 86 and an upper threshold 88 corresponding to the desired air temperature range. For example, it may be desirable for certain compressors to receive air within a 10, 9, 8, 7, 6, 5, 4, 3, or 2 degree Fahrenheit, or less, range of the average air temperature. In such configurations, the controller 40 may identify an excessive temperature variation within the inlet 24 if a temperature within one region exceeds the upper threshold 88 or decreases below the lower threshold 86. Alternatively, the upper threshold 88 and the lower threshold 86 may be defined based on a percentage difference between the detected temperature and the average temperature. For example, in certain embodiments, it may be desirable the compressor 22 to receive air within a 15%, 12%, 10%, 8%, 6%, 4%, or less, range of the average air temperature.

In alternative embodiments, the controller 40 may be configured to detect an excessive temperature variation within the air flow into the compressor 22 by comparing a temperature difference between regions to a threshold value. In such embodiments, the display 74 may be configured to show a single curve indicative of a difference between the maximum detected temperature of a region and the minimum detected temperature of a region. The graph may also include a threshold indicative of the maximum desired temperature variation. If the temperature difference between the maximum detected temperature and the minimum detected temperature exceeds the threshold value, the controller 40 may identify an excessive temperature variation within the air flow. For example, the threshold value indicative of an excessive temperature variation may be less than approximately 20, 17, 15, 12, 10, 8, 6, 4, or 2 degrees Fahrenheit, or less, for certain compressor configurations. Alternatively, the threshold value may be defined as a percentage difference between the minimum and maximum detected temperatures. In such a configuration, the threshold value may correspond to a 30%, 25%, 20%, 15%, 10%, 5%, or less, percentage difference.

If an excessive temperature variation is detected, the controller 40 may activate the alarm 76 within the user interface 42. As previously discussed, the alarm 76 may be an audible alarm and/or a visual alarm configured to alert an operator of the detected condition. The operator may then take appropriate corrective action to resolve the air temperature variation. In addition, the controller 40 and/or the user interface 42 may be communicatively coupled to the gas turbine engine 10, and configured to decrease compressor speed and/or deactivate the engine upon detection of the excessive temperature variation. For example, in certain embodiments, if the temperature variation exceeds a first threshold value, the controller 40 may reduce engine power, thereby decreasing compressor speed. If the temperature variation exceeds a second threshold value, higher than the first threshold value, the controller 40 may deactivate the gas turbine engine 10. Such actions may substantially extend the operational life of the compressor blades, thereby decreasing turbine engine maintenance costs.

Figure 4:
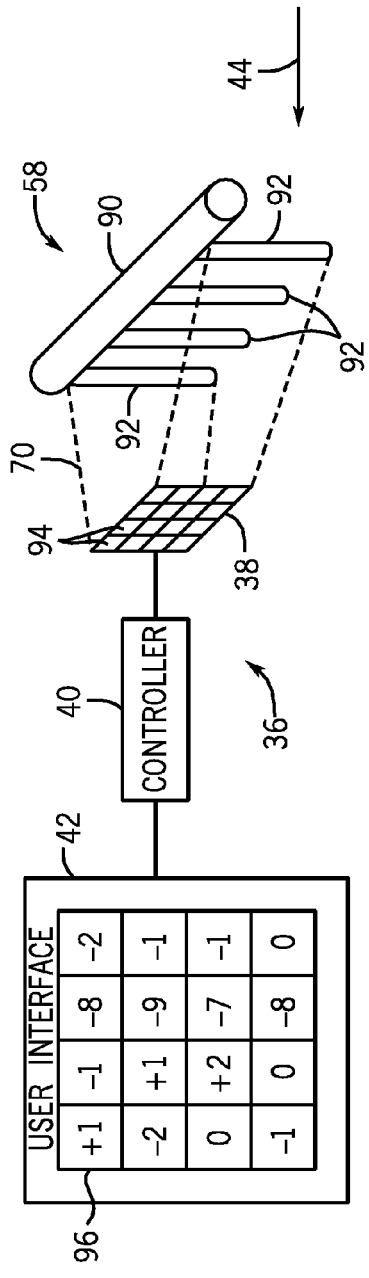
FIG. 4 is a schematic of an embodiment of the thermal measurement system directed toward an air flow downstream from an inlet bleed heat system.

FIG. 4 is a schematic of an embodiment of the thermal measurement system 36 directed toward an air flow downstream from an inlet bleed heat system 58. As previously discussed, the inlet bleed heat system 58 is configured to transfer heat from the compressor discharge air to air flowing through the inlet 24. Consequently, the inlet bleed heat system 58 may substantially reduce the possibility of ice formation within the inlet 24 during periods when the turbine system 10 is operating at reduced power. In addition, by heating the air flow into the compressor 22, the inlet bleed heat system 58 may substantially reduce the possibility of back flow through the compressor 22, thereby ensuring the integrity of the gas turbine system 10.

As illustrated, the inlet bleed heat system 58 includes a distribution header 90 and heating tubes 92. In the illustrated configuration, the distribution header 90 receives the air flow from the compressor and distributes the air to the heating tubes 92. In certain embodiments, the temperature of the air flow from the compressor 22 may be greater than approximately 600, 700, 800, or 900 degrees Fahrenheit, or more. Consequently, as air flowing through the inlet 24 in the downstream direction 44 contacts the heating tubes 92, heat from the compressor discharge air is transferred to the air flow within the inlet 24. As will be appreciated, the degree of heat transfer to the inlet air may be at least partially dependent on the number of heating tubes 92. While four heating tubes 92 are employed in the present embodiment, it should be appreciated that more or fewer tubes 92 may be utilized in alternative embodiments. For example, certain inlet bleed heat systems 58 may include more than 1, 2, 3, 4, 5, 10, 15, 20, 25, 30, or more tubes 92.

The illustrated thermal radiation detector array 38 is directed toward the inlet bleed heat system 58 such that the entire cross-section of the air flow downstream from the inlet bleed heat system 58 falls within the field of view 70 of the detector array 38. In this manner, the detector array 38 may monitor the two-dimensional temperature profile of the air flow downstream from the inlet bleed heat system 58, thereby ensuring that substantially any temperature variation induced by the inlet bleed heat system 58 will be detected. As previously discussed, the thermal radiation detector array 38 may include multiple thermopile elements 94, with each thermopile element directed toward a different region of the air flow cross-section. In this configuration, the thermal radiation detector array 38 may output a signal indicative of the temperature of each region such that the controller 40 may establish a two-dimensional temperature profile of the air flow.

In the present embodiment, the thermal radiation detector array 38 includes a 4×4 matrix of thermopile elements 94. In this configuration, each column of the thermal radiation detector array 38 may be directed toward a respective heating tube 92 such that a temperature of the air flowing downstream from each heating tube 92 may be independently monitored. However, it should be appreciated that alternative thermal radiation detector arrays 38 may include more or fewer thermopile elements 94. For example, certain thermal radiation detector arrays 38 may include more than 1, 2, 4, 6, 8, 10, 15, 20, 25, 30, or more rows and/or more than 1, 2, 4, 6, 8, 10, 15, 20, 25, 30, or more columns. It should also be appreciated that certain thermal radiation detector arrays 38 may be circular, elliptical or polygonal, among other shapes, with the thermopile elements 94 substantially covering the surface of the detector array 38. Furthermore, it should be appreciated that alternative thermal radiation sensors (e.g., CCD, FPA, pyrometer, etc.) may form elements of the thermal radiation detector array 38.

As will be appreciated, the overall sensitivity of the thermal measurement system 36 may be dependent on the sensitivity of the thermopile elements 94, the accuracy of the thermal radiation detector array 38, optical and/or electrically noise within the system 36, the accuracy of a signal conditioner within the controller 40, the quality of the thermal radiation sensor optics, the field of view of each thermopile element and/or the techniques used by the controller 40 to compute temperature, among other factors. For example, in certain embodiments, the thermal measurement system 36 may be able to identify temperature variations of less than approximately 2, 1, 0.75, 0.5, or 0.25 degrees Fahrenheit, or less. Consequently, the thermal measurement system 36 may detect thermal variations within the air flow prior to excessive wear of the compressor blades, thereby substantially reducing compressor maintenance costs. Because the sensitivity of the thermal measurement system 36 is at least partially dependent on the field of view of each thermopile element 94, it should be appreciated that thermal measurement system sensitivity may be enhanced by employing a larger number of thermopile elements 94. In this manner, each thermopile element 94 will monitor a smaller region of the air flow, thereby increasing the sensitivity of each element 94.

Similar to the thermal measurement system 36 described above with reference to FIG. 3, the illustrated thermal measurement system 36 includes a user interface 42 communicatively coupled to the controller 40. The illustrated user interface 42 includes a numerical display 96 configured to present a numerical representation of the temperature of each region within the field of view 70 of the detector array 38. In the present embodiment, the display 96 is configured to output a temperature difference between each monitored region and an average temperature of the air flow. It should be appreciated, that alternative embodiments may include a display 96 configured to present the absolute temperature of each region. In the present embodiment, the temperature values are shown in degrees Fahrenheit.

As previously discussed, the controller 40 may be configured to detect an excessive temperature variation within the air flow by comparing the temperature difference between each monitored region and the average air flow temperature to a threshold value. In the illustrated embodiment, the threshold value is 5 degrees Fahrenheit, which corresponds to the maximum desired temperature variation within the air flow to the compressor 22. As previously discussed, a higher or lower threshold value may be employed in alternative embodiments. Because the illustrated thermal radiation detector array 38 includes four rows of thermopile elements 94, each row measures the air flow temperature downstream from a respective heating tube 92. As illustrated, each temperature within the left column of the display 96 indicates a temperature difference of less than 5 degrees from the average temperature. Similarly, each temperature difference within the right column and the column second from the left are within the 5 degree tolerance. Consequently, the display 96 indicates that the corresponding heating tubes 92 are not inducing an excessive temperature variation. In contrast, the temperature measurements corresponding to the second heating tube 92 from the right indicate that the tube 92 is not effectively heating the surrounding air. Specifically, the temperature of each region corresponding to the air flow downstream from the second heating tube 92 from the right is more than 5 degrees lower than the average temperature. Therefore, the controller 40 will detect the excessive temperature variation, and activate an alarm, decrease compressor speed and/or deactivate the compressor 22.

Figure 5:
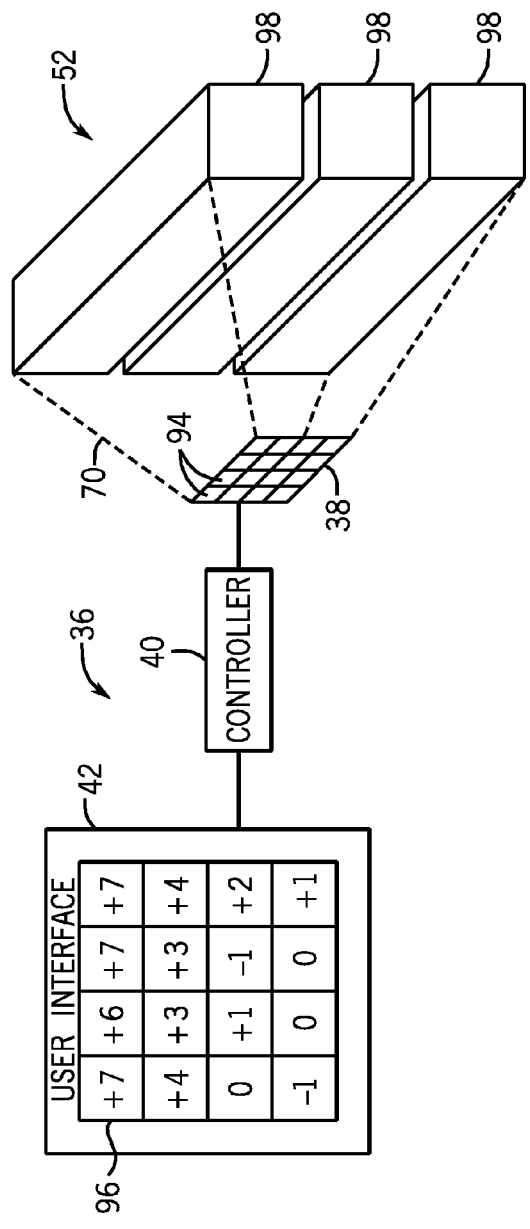
FIG. 5 is a schematic of an embodiment of the thermal measurement system directed toward an air flow downstream from a chiller system.

FIG. 5 is a schematic of an embodiment of the thermal measurement system 36 directed toward an air flow downstream from the chiller system 52. As illustrated, the chiller system 52 includes three heat transfer coils 98 configured to transfer heat from the inlet air to chilled fluid circulating within the coils 98. As previously discussed, the chilled fluid may be generated by a mechanical refrigeration system, for example. While three heat transfer coils 98 are employed in the present embodiment, it should be appreciated that more or fewer coils 98 may be utilized in alternative embodiments. For example, certain chiller systems 52 may employ 1, 2, 3, 4, 5, 6, or more heat transfer coils 98.

As illustrated, the heat transfer coils 98 are arranged horizontally across the inlet 24. In this configuration, one or more rows of thermopile elements 94 are directed toward the air flow downstream from each heat transfer coil 98. For example, the top two rows of elements 94 are directed toward the top heat transfer coil 98. In the present embodiment, the display 96 is configured to output a temperature difference between each monitored region and an average temperature of the air flow. As can be seen on the display 96, the air temperature within a region monitored by the top two rows is elevated compared to the air temperature within a region monitored by the bottom two rows. Specifically, each thermopile element 94 within the top row is detecting an air temperature more than 5 degrees higher than the average air temperature within the inlet 24. Such a temperature variation may indicate that the top heat transfer coil 98 is not operating effectively. Consequently, the controller 40 will detect an excessive temperature variation within the air flow to the compressor 22, and alert the operator of the condition so appropriate corrective action may be taken. While FIGS. 4 and 5 illustrate detection of a temperature variation downstream from the inlet bleed heat system 58 and the chiller system 52, respectively, it should be appreciated that a similar configuration may be employed to detect temperature variations downstream from the evaporative cooling system 50, the fogger system 60, or other temperature control devices within the inlet 24.

Figure 6:
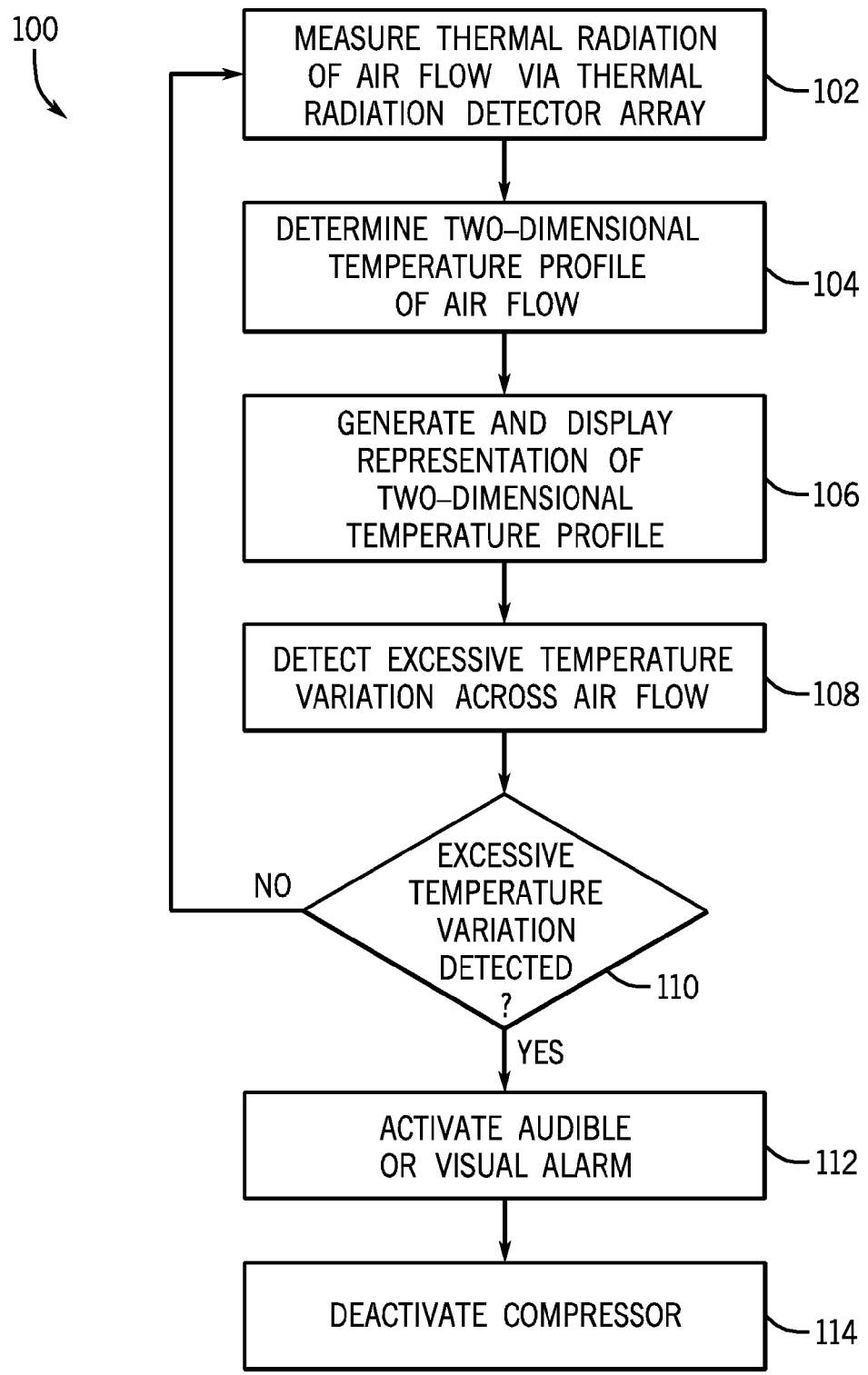
FIG. 6 is a flowchart of an embodiment of a method for detecting an excessive temperature variation across an air flow by measuring thermal radiation of the air flow via a thermal radiation detector array.

FIG. 6 is a flowchart of an embodiment of a method 100 for detecting an excessive temperature variation across an air flow by measuring thermal radiation of the air flow via a thermal radiation detector array 38. First, as represented by block 102, thermal radiation of the air flow is measured via the thermal radiation detector array 38. As previously discussed, the thermal radiation detector array 38 may include multiple thermopile elements, each directed toward a different region of the air flow. Each thermopile element is configured to output a signal having a magnitude proportional to the temperature of the respective region. The thermal radiation detector array 38 is configured to aggregate the signals from each element, and to output the resultant signal to the controller 40. Next, as represented by block 104, a two-dimensional temperature profile of the air flow is determined based on the thermal radiation measurement. For example, the controller 40 may receive the resultant signal from the thermal radiation detector array 38, and determine the two-dimensional temperature profile based on the magnitude of each thermopile element signal. A representation of the two-dimensional temperature profile may then be generated and displayed, as represented by block 106. For example, the display 74 may present a series of curves 83 showing the temperature of each region as a function of time. Alternatively, the display 96 may present a numerical representation of the temperature of each region.

Next, as represented by block 108, an excessive temperature variation across the air flow may be detected based on the two-dimensional temperature profile. For example, the controller 40 may be configured to detect the excessive temperature variation if a temperature difference between a region of the air flow and an average temperature of the air flow exceeds a threshold value. Alternatively, the controller 40 may be configured to detect the excessive temperature variation if a temperature difference between a first region of the air flow and a second region of the air flow exceeds a threshold value. If an excessive temperature variation is detected, as represented by block 110, an audible and/or visual alarm may be activated to alert an operator of the condition, as represented by block 112. For example, once an operator has been informed of the condition, the operator may deactivate the compressor, thereby substantially reducing the possibility of excessive compressor blade wear that may decrease the operational life of the blades. In addition, the compressor 22 may be automatically deactivated upon detection of an excessive temperature variation, as represented by block 114. For example, in certain embodiments, the controller 40 may be communicatively coupled to the gas turbine engine 10, and configured to decrease compressor speed and/or deactivate the engine 10 upon detection of the excessive temperature variation.

It should be appreciated that alternative actions may be taken by the operator or the controller 40 if an excessive temperature variation across the air flow is detected. For example, if a thermal radiation detector array 38 positioned downstream from the inlet bleed heat system 58 detects an excessive temperature variation, the operator may adjust flow into the inlet bleed heat system 58 to compensate for the temperature variation. Similarly, the operator may adjust flow into the evaporative cooling system 50, the chiller system 52 or the fogger system 60 to compensate for an excessive temperature variation detected downstream from the respective temperature control device. In further embodiments, the controller 40 may adjust the operation of the compressor (e.g., decrease compressor speed) to mitigate blade wear that may be induced by the excessive temperature variation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
   a radiation detector array directed toward a fluid flow into a compressor, wherein the radiation detector array comprises a plurality of thermopile elements and is configured to output a signal indicative of a two-dimensional temperature profile of the fluid flow; and
   a controller communicatively coupled to the radiation detector array, wherein the controller is configured to detect a temperature variation across the fluid flow based on the signal.

2. The system of claim 1, comprising an optical focusing device configured to focus thermal radiation from the fluid flow onto the radiation detector array.

3. The system of claim 2, wherein the optical focusing device comprises a mirror, a lens, or a combination thereof.

4. The system of claim 1, comprising a band-pass filter disposed between the radiation detector array and the fluid flow, wherein the band-pass filter is configured to block passage of electromagnetic radiation having a wavelength less than approximately 7.2 microns and greater than approximately 12.4 micron.

5. The system of claim 1, wherein the radiation detector array is configured to detect thermal radiation having a wavelength within an infrared spectrum.

6. The system of claim 1, wherein the controller is configured to detect the temperature variation if a temperature difference between a region of the fluid flow and an average temperature of the fluid flow exceeds a threshold value.

7. The system of claim 1, wherein the controller is configured to detect the temperature variation if a temperature difference between a first region of the fluid flow and a second region of the fluid flow exceeds a threshold value.

8. The system of claim 1, wherein the radiation detector array comprises a plurality of radiation detector arrays, each directed toward a different area of a compressor inlet.

9. The system of claim 1, comprising a gas turbine engine having the compressor.

10. A system comprising:
    an inlet configured to provide an air flow to a compressor; and
    a radiation detector array directed toward a cross-section of the inlet substantially perpendicular to a direction of the air flow, wherein the radiation detector array comprises a plurality of thermopile elements and is configured to output a signal indicative of a two-dimensional temperature profile of the air flow within the cross-section.

11. The system of claim 10, comprising a controller communicatively coupled to the radiation detector array, wherein the controller is configured to detect a temperature variation across the air flow within the cross-section based on the signal.

12. The system of claim 11, wherein the controller is configured to detect the temperature variation if a temperature difference between a region of the two-dimensional temperature profile and an average temperature of the two-dimensional temperature profile exceeds a threshold value.

13. The system of claim 10, wherein the inlet comprises a temperature control device configured to vary a temperature of the air flow.

14. The system of claim 13, wherein the radiation detector array is directed toward a cross-section of the inlet downstream from the temperature control device.

15. A method comprising:
   measuring thermal radiation of an air flow into a compressor via a radiation detector array, wherein the radiation detector array comprises a plurality of thermopile elements, and each thermopile element is directed toward a different region of the air flow;
   determining a two-dimensional temperature profile of the air flow based on the measurement; and
   detecting a temperature variation across the air flow based on the two-dimensional temperature profile.

16. The method of claim 15, wherein detecting the temperature variation across the air flow comprises:
   computing a first temperature difference between a first region of the air flow and an average temperature of the air flow, computing a second temperature difference between the first region of the air flow and a second region of the air flow, or a combination thereof; and
   comparing the first temperature difference, the second temperature difference, or a combination thereof, to a threshold value indicative of the temperature variation.

17. The method of claim 15, comprising generating and displaying a graphical or numerical representation of the two-dimensional temperature profile of the air flow.

18. The method of claim 15, comprising activating an alarm upon detection of the temperature variation across the air flow.

19. The method of claim 15, comprising deactivating the compressor upon detection of the temperature variation across the air flow.

* * * * *